(12) United States Patent
Lee

(10) Patent No.: US 6,830,484 B1
(45) Date of Patent: Dec. 14, 2004

(54) CABLE CONNECTING SYSTEM AND ITS APPLICATION TO PARTITIONS

(76) Inventor: Jae-Uk Lee, Bundang-Gu, Imae-Dong, Imae-chon, Samsung APT., 1002-501, Sungnam-si, Kyunggi-do 463-901 (KR)

( * ) Notice: Subject to any disclaimer, the term of this patent is extended or adjusted under 35 U.S.C. 154(b) by 0 days.

(21) Appl. No.: 10/445,006

(22) Filed: May 27, 2003

(51) Int. Cl.$^7$ ............................................. H01R 25/00
(52) U.S. Cl. ........................................ 439/640; 439/660
(58) Field of Search .................................. 439/640, 660, 439/668

(56) References Cited

U.S. PATENT DOCUMENTS

| | | | | |
|---|---|---|---|---|
| 3,668,604 A | * | 6/1972 | Rossman | 439/70 |
| 4,478,472 A | * | 10/1984 | Baar | 439/296 |
| 5,160,276 A | * | 11/1992 | Marsh et al. | 439/638 |
| 5,466,172 A | * | 11/1995 | Carstens et al. | 439/640 |
| 6,261,107 B1 | * | 7/2001 | Takase et al. | 439/660 |

* cited by examiner

*Primary Examiner*—Renee Luebke
(74) *Attorney, Agent, or Firm*—GWiPS

(57) ABSTRACT

A cable connector for providing a communication network comprises a first connector (10) forming a plurality of first arrays (11) with first terminals (11a), a second connector (5) forming a plurality of second arrays (6) and at least one twig array (7) with second terminals (6a). Each array consists of the same number of first or second terminals (6a, 11a) arranged at intervals and in the same pattern. The first and second arrays (6, 11) and twig arrays (7) are form a plurality of rows arranged at the same intervals. The second connector (5) is provided with at least one more array than the first connector (10). Thus, the first connector (10) can be selectively connected to the second arrays (6) and twig arrays (7) of the second connector (5) for altering the configuration of the electrical connection. A plurality of modular communication cable units are installed in a manner such that the first connector of the front cable unit is connected to the second connector of the next cable unit. At each junction point, it is possible to provide the required number of enabled twig connectors depending on the required number of workstations. The corresponding number of disconnected lines which do not receive data and signals from upstream remain on standby in Dummy mode.

3 Claims, 4 Drawing Sheets

CABLE CONNECTING SYSTEM AND ITS APPLICATION TO PARTITIONS

BACKGROUND OF THE INVENTION

1. Field of the Invention

The present invention relates to a cable connecting device for providing various electrical connections in a communication system and its application to a wall partition structure. More particularly, the cable connecting device enables selective electrical connections, by way of telephone or LAN, in a communication system, depending on a user's requirement, by shifting the position of connecting ports.

2. Related Prior Art

Generally, an indoor wiring system interconnects a plurality of computers by way of central equipment such as a Hub, thereby forming a network. Such a wiring system provides communication signals, whether voice or data, and electric power to each workstation through communicating cable. Voice signals are transmitted via a telephone, and data signals are transmitted via a local area network or a computer modem.

Once a wiring system is completed for providing communication, it is difficult to alter the arrangement of the system because indoor communicating cable is usually installed inside of the wall partitions or underneath the carpet or floor. Although some wiring systems employ connecting devices with the communicating cable, most connecting devices have difficulties in satisfying a desired rearrangement of an indoor wiring system. Thus, it is both disadvantageous and costly to remove a wiring system and install a new arrangement.

In order to solve the aforementioned problems, many kinds of interconnecting devices and wiring systems are suggested. For example, U.S. Pat. No. 5,160,276 and U.S. Pat. No. 6,299,490 disclose communication cable connectors and a wiring system arrangement for providing voice and data signals to individual workstations. However, these inventions have disadvantages in that it is hard to vary workstation arrangements due to a fixed number of breakout ports. From an economic viewpoint, a good connecting device and wiring system is not possible because each connector provides a certain number of regular breakouts regardless of demand. If it is necessary to increase the number of connecting ports in order to expand capacity at certain positions, additional interconnecting modules are required.

Therefore, it is preferable to provide cable connecting devices and wiring systems that allow alternative distributions for signal connections.

If a workstation arrangement is modified, it will take only a few minutes to rearrange signal distributions by simply altering the corresponding connectors without wasting extra cables usually needed for rearrangement.

SUMMARY OF THE INVENTION

In order to overcome the aforementioned disadvantages, an objective of the present invention is to provide a new functional cable connector having twig connectors for effectively distributing signals and data to workstations. A twig connector is a breakout line for connecting to a telephone, LAN or computer terminal.

Another objective and feature is to provide a communication cable connector and wiring assembly including a first connector and a second connector associated with at least one twig connector. The first connector and second connector are mated to each other.

The first connector forms a plurality of first arrays consisting of first terminals. The required number of first terminals in the first array is determined by the communication device. The second connector forms a plurality of second arrays and at least one twig array, each of which consists of at least one second terminal. The first and second arrays and twig arrays each consist of the same number of first terminals or second terminals, arranged at the same intervals and in the same pattern. The second connector is provided with at least one more array than the first connector, and the first arrays and second arrays along with the twig array form a plurality of rows arranged at the same intervals, so that the first connector can be selectively connected to the second connector for altering the configuration of the electrical connection.

Since the second connector has at least one more row than the first connector, it is possible to vary the connecting positions.

The advantage of this invention is that the number of enabled twig connectors at each connecting location is easily determined by selectively positioning the connection between the first and second connectors.

BRIEF DESCRIPTION OF THE DRAWINGS

The features and advantages of this invention will become more apparent and better understood by reference to the following description of embodiments taken in conjunction with the accompanying drawings, wherein:

Identical numeral characters are used for the corresponding parts throughout the drawings. As shown in FIGS. 3 through 7, exemplifications are set out to illustrate the preferred embodiments, and such exemplifications are not to be construed as limiting the scope of the present invention in any manner.

DETAILED DESCRIPTION OF THE INVENTION

Figure 1:
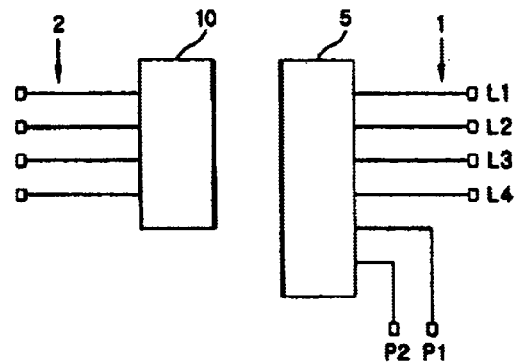
FIG. 1 is a front view of a cable connector prior to making an electrical connection in the communication system of the present invention.

In order to achieve the aforementioned objectives, this invention introduces a new concept of cable connecting device comprising: a first connector forming a plurality of first arrays wherein each first array is composed of a row of pins as first terminals, a second connector forming a plurality of second arrays, wherein each second array is composed of a row of pinholes as second terminals, and at least one twig array. A twig array is a row of pinholes for breaking out the connecting lines to a telephone, LAN or computer terminal. The number of second terminals (pinholes) arranged in each pinhole array is the same as the number of the first terminals (pins), arranged in each pin array so that the first arrays (rows of pins) of the first connector mate with the second arrays (rows of pinholes) of the second connector for providing proper electrical connections. Because the second connector has at least one twig array, the second connector has one more array than the first connector. Due to the extra array in the second connector, the first connector is able to selectively connect to the second connector by shifting position vertically. In this way, the unselected connecting arrays in the second connector remain on standby in "Dummy" mode.

Each second array at one cable end is connected to a corresponding first array at the other cable end. Each twig array (7) is connected to the corresponding twig connector (3). The twig connector is a breakout line for connecting to a telephone, LAN or computer terminal.

The first connector (10) is mated to the second connector (5) with twig arrays in the proper position to provide the desired communicating connection. At this point, if a certain number of twig arrays (7) is selected to be enabled, the same number of unselected arrays in the second connector will not be connected to the first arrays of the first connector, but will remain on standby in Dummy mode.

Referring to FIG. 1, a cable connector for providing various electrical connections in the communication system is disclosed. A first connector (10) disposed at the output end of the first cable (2) forms a plurality of first arrays. Each first array consists of a plurality of pins or male terminals (11a), arranged in a certain pattern. A second connector disposed at the input end of the second cable (1) forms a plurality of second arrays including one or more twig arrays. Each second array and twig array consists of a row of pin-holes or female terminals (6a). In order to provide the proper connections, the connecting terminals of each array have the same number and pattern of arrangement. The second connector has at least one more array than the first connector because the second connector includes at least one twig array. The first terminals are plugs or male terminals and the second terminals are receptacles or female terminals (6a). The first connector (10) enables selective connection to the second connector (5) by shifting position vertically to alter the electrical connecting condition. Due to the extra number of connecting arrays in the second connector, the first connector may be shifted or slid vertically. Generally, a plurality of communicating cables having first and second connectors is connected together in series or in parallel for transmitting data and signals from the Hub to workstations, Usually, it is possible to use multiple cable connecting units in a wiring system. At this point, the first connector of the front cable is matched to the second connector of the following cable unit.

An exemplary configuration is cited here for illustrating a typical connector, which comprises a first connector (10) having four first connecting arrays and a second connector (5) also having four second connecting arrays in addition to two twig-connecting arrays (7). Because the second connector (5) has six arrays—that is, two more arrays than the first connector (10)—it is possible for the first connector to be mated to the second connector (5) in several different configurations.

Figure 2A:
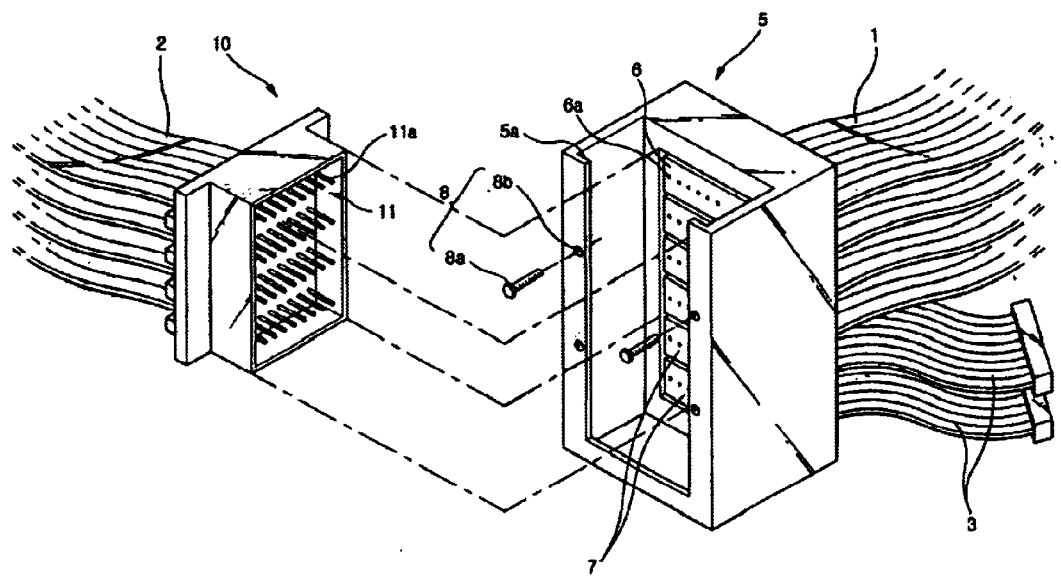
FIG. 2a is a perspective view of the cable connector prior to making an electrical connection in the communication system of the present invention.
Figure 2B:
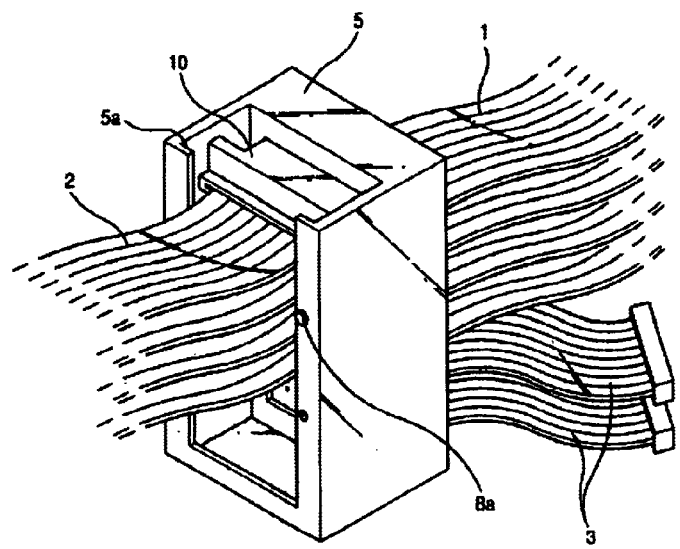
FIG. 2b is a perspective view of the cable connector providing an electrical connection in the communication system of the present invention.

As shown in FIGS. 2a and 2b, a perspective view of a cable connector is presented before and after providing an electrical connection in the communication system.

The output (first) connector (10) has a plurality of output (first) connecting arrays (11) with male terminal pins (11a). The input (second) connector (5) has a plurality of input (second) connecting arrays (6) with female terminal holes (6a) and a least one twig array (7). The input connecting arrays in the input connector form a plurality of female terminal holes (6a) that have the same number and arrangement pattern as the male terminal pins (11a) in the output array (6). At this point, the output connector (10) can be female terminal holes (6a) and the input connector (5) can be male terminal pins (11a) or vice versa. In this example, the output connector (10) employs eight male terminal pins (11a), and the input connector (5) employs eight female terminal holes (6a). For the telephone connection, the output connector (10) has four male terminal pins (11a), and the input connector (5) has four female terminal holes (6a). The number of male and female terminals (6a, 11a) varies depending on the connecting devices employed. As discussed above, the input connector (5) includes at least one more connecting array (6) than the output connector (10), with at least one twig-connecting array (7). Due to the extra number of connecting arrays (6) in the input connector (5), the output connector (10) may be shifted or slid vertically for selectively altering the electrical connection. At this moment, the unmated arrays of the input connector (5) cannot transmit data or signals, and would remain on standby in Dummy mode.

When the output connector (10) is connected to the input connector (5), the output connector (10) is inserted into the top of the housing of the input connector (5) and set in proper position to effect the desired electrical connection. Then, the input and output connectors are squeezed together to properly engage the pins (11a) and holes (6a).

In this instance, the output connector (10) has four rows of output connecting arrays (11), with eight male terminal pins (11a) in each array, and the input connector (5) has six rows of input connecting arrays (6) with eight female terminal holes (6a) in each array.

The male terminal pins (11a) and female terminal holes (6a) in each array have the same intervals and arrangement of patterns to match one another. Each row —that is, each of the first and second connecting arrays of the first and second connectors (5, 10) —is arranged with the same intervals to match one another. In this way, the first connector (10) will match the second connector (5) when the first connector (10) is shifted downward or upward by one-row intervals. The twig array is connected to the twig connector.

Once the first connector (10) is inserted into the top of the second connector (5) housing, it can be properly positioned for the desired electrical connection. Then, both first and second connectors (5, 10) are squeezed and slid in the longitudinal direction to engage with each other.

After both first and second connectors (5, 10) properly engage with each other, two pairs of fasteners (8) are screwed down to secure both connectors (5, 10) to maintain a secure electrical connection.

The structure of the second connector (5) provides a space for receiving the first connector (10), a set of guide strips (5a) disposed at both the sides and bottom edges of a frame, and four fasteners (8a) and fastener holes (8b) for retaining the first connector (10) at the proper position. Both lateral walls of the interior of the second connector (5) have a series of protruding stoppers at uniform intervals. Each of the stoppers is aligned to the same level as the female terminal holes (6a).

The structure of the first connector (10) forms a drawer shape, with a pair of strips at both lateral edges to mate with a set of guide strips (5a) of the second connector (5). The top opening of the second connector (S) is a little wider than that of the first connector (10). The top opening of the second connector (5) is a little thicker than that of the drawer shape of the first connector (10). Both lateral edges of the strips of the first connector (10) have a series of notches at uniform intervals. Each notch is aligned to the same level as the male terminal pins (11a). When the first connector (10) is inserted from the top of the housing of the second connector (5), the notches on both strip edges of the first connector (10) are latched to the protruding stoppers of the second connector (5) to properly align the position. The first connector (10) may be inserted and slid down at a constant interval to stop at the correct position for the desired electrical connection. Once the first connector (10) is positioned for the desired electrical connection, both first and second connectors (5, 10) are squeezed and slid in the longitudinal direction to properly engage with each other. Thereafter, the fasteners (8) are secured to prevent the connectors from disengaging and to maintain the connection.

Another method of connection is that the first connector (10) is faced toward the second connector (5), and the connectors are rotated in the opposite direction from each other until the first connecting arrays of the first connector (10) match with the proper position of the second connecting arrays (6) of the second connector.

Figure 2C:
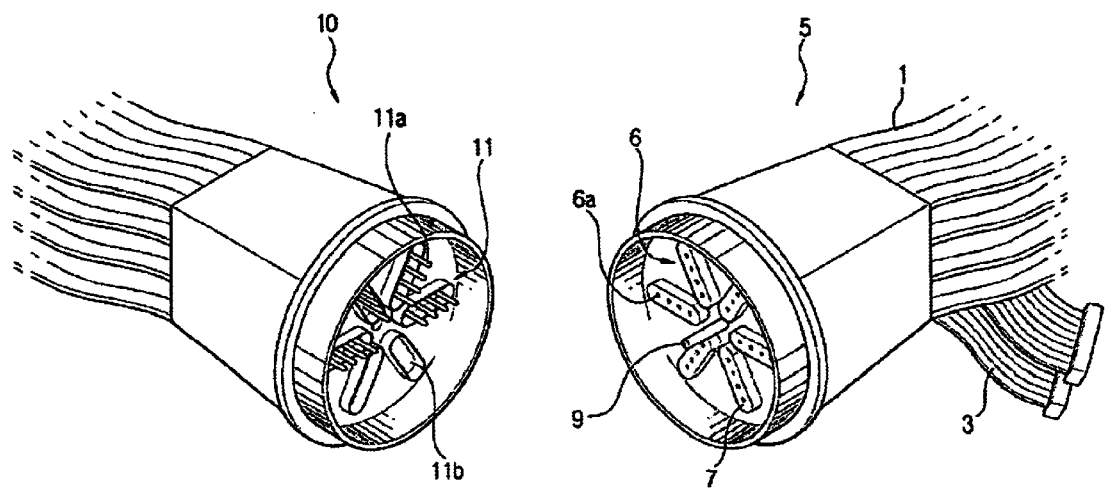
FIG. 2c is a perspective view of a rotary type cable connecting unit of the second embodiment of the present invention.

As shown in FIG. 2c, the rotary type cable connecting unit comprises a first connector (10) having a disk shape arranged six arrays including four first connecting arrays (11) and two dummy arrays in he radial direction, and the second connector (5) having disk shape arranged six arrays with four second connecting arrays (6) and two twig connecting arrays (7) in the radial direction. The terminals of the arrays on each disk are arranged with the same numbers and intervals to mate each other. An axle (9) is mounted at the center of the both disks to easily rotate.

In order to enable the twig connector (3), the first and second connectors (10, 5) are rotated in the opposite direction each other until the first connecting arrays (11) is located at the desired connecting position of the second array (6). Then, both first connector and second connector are squeezed together to properly engage the pins (11a) and holes (6a) with one another.

Figure 3:
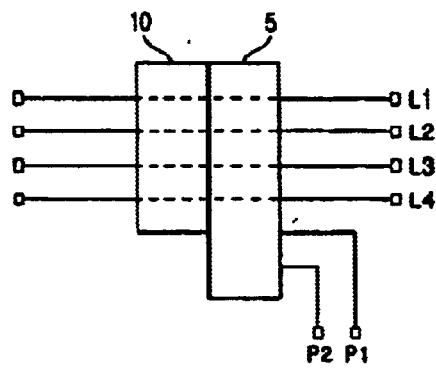
FIG. 3 is a front view of the cable connector providing an electrical connection to lines L1 through L4.
Figure 4:
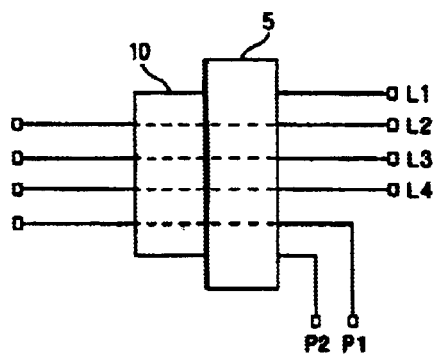
FIG. 4 is a front view of a cable connector providing an electrical connection to lines L2 through L4 and a twig connector P1.
Figure 5:
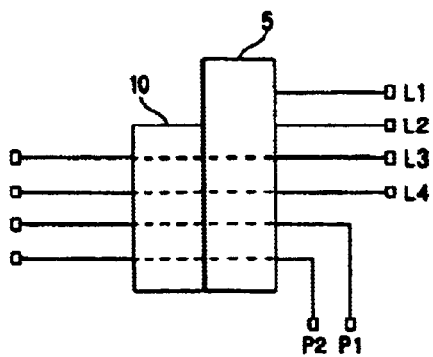
FIG. 5 is a front view of a cable connector providing an electrical connection to lines L3 through L4 and twig connectors P1 and P2.

Referring to FIGS. 3 through 5, some practical arrangements of electrical connections are presented for a communicating system.

As seen in FIG. 3, four of the first arrays of the first connector (10) are directly connected to four of the second arrays (L1–L4) of the second connector (5). Both twig connectors (P1, P2) are disabled since the twig arrays in the second connector (5) are not mated with any of the first arrays of the first connector, but all signals and data pass downstream through connected array lines 1 to 4 (L1 to L4).

As shown in FIG. 4, the first connector (10) is shifted downward one interval to provide a different configuration of the electrical connection. The first connector (10) connects to the second through fourth arrays (L2~L4) of the second connector (5) and to one twig array (7). In this way, the first connector connects to three lines of the second connector (5) and one twig array (7) for enabling a twig connector (P1) and disconnecting a line (L1) of the second connector (5). Therefore, the disconnected line (L1) will not receive data and signals from upstream, and will remain on standby in Dummy mode.

As shown in FIG. 5, the first connector (10) is shifted downward two intervals to provide another different configuration of the electrical connection. The first connector (10) connects the third and fourth arrays (L3~L4) of the second connector (5) and to two twig arrays (7). Both twig connectors (P1, P2) are enabled at the expense of the disconnected first and second lines (L1, L2) of the second connector (5). Therefore, the disconnected lines (L1, L2) will not receive data and signals from upstream, and will remain on standby in Dummy mode.

Figure 6:
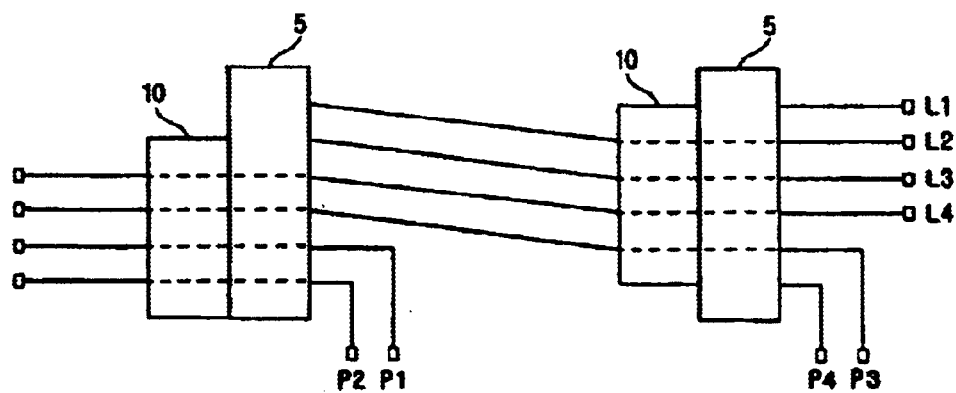
FIG. 6 illustrates an application of cable connectors providing an electrical connection by multiple cable units with twig connectors PI, P2 and P3.

As seen in FIG. 6, a practical application for utilizing this invention is presented by connecting a plurality of communication modular cable units (1, 2). In this case, the twig connectors P1 through P3 are enabled at the expense of disconnected lines L1 through L3. At each junction, the number of enabled twig connectors (P) is adjusted and controlled by altering the connecting position of the first and second connectors depending on the required number of workstations.

Figure 7:
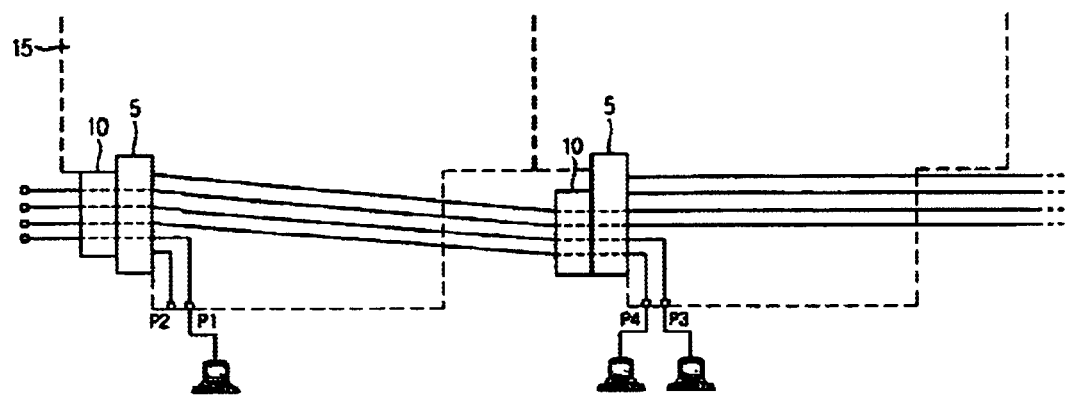
FIG. 7 is a wall partition illustrating another application of the present invention.

Finally, the most desirable wiring connecting system of the present invention is shown in FIG. 7. The communication cable units (1, 2) are installed through wall partitions (15) for wiring the workstations. A plurality of modular communication cable units are installed in a manner such that the output connector of the front cable unit is connected to the input connector of the next cable unit to provide the required number of breakouts at the junction points depending on the required number of enabled twig connectors for connecting to the workstations. At each junction point, the required number of enabled twig connectors is the same as that of the disconnected lines, which do not receive data and signals from upstream and remain on standby in Dummy mode.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cable connection unit affixed to a pair of cable connectors at each end providing various electrical connections in a communication system comprises:

a first connector (10) forming a plurality of male arrays (11), each male array (11) consisting of one or male terminal (11a), a second connector (5) forming a plurality of female arrays (6) and at least one twig array (7), each female array (6) and twig array (7) consisting of one or more female terminals (6a), said second connector (5) providing at least one more array than said first connector (10), said male arrays (11) and said female arrays (6) each having terminals of the same number, interval and arranging pattern, and intervals of said male arrays (11) of said first connector (10) arranged the same as that of said female arrays (6)

and twig array (7) of said second connector (5), so that said first connector is selectively connected to said second connector (5) by shifting a connecting position for altering the electrical connection, wherein, said second connector (5) provides a top opening and a pair of guide strips (5a) at both side edges for inserting said first connector (10) and sliding along the guide strips for selecting a demanded electrical connection, and a fastening mean, for maintaining a good electrical connection.

2. A cable connection unit as claimed in claim 1, wherein said cable connection unit having a male connector at one cable end and a female connector at the opposite cable end is applied to a modular communication system for providing a series connection in a wall partition, said modular communication system consisting of a plurality of cable connection units installed in series in such a manner that said male connector of a front cable unit is connected to said female connector of a next cable unit for providing enabled twig connectors at each connecting point according to a demanded number of workstations.

3. A cable connection unit as claimed in claim 2, wherein a plurality of connecting point, in the modular communication system is located at each wall partition for altering the electrical connection by shifting the connectors according to the demanded number of workstations.

* * * * *